US00RE39379E

(19) United States
(12) Reissued Patent
Wechsler

(10) Patent Number: US RE39,379 E
(45) Date of Reissued Patent: Nov. 7, 2006

(54) ARTICLE ANCHORING ACCESSORY FOR USE WITHIN AN ENCLOSURE

(76) Inventor: Lawrence I. Wechsler, One Wooleys La., Great Neck, NY (US) 11023

(21) Appl. No.: 09/755,518

(22) Filed: Jan. 5, 2001

Related U.S. Patent Documents

Reissue of:
(64) Patent No.: 5,855,982
Issued: Jan. 5, 1999
Appl. No.: 08/487,291
Filed: Jun. 7, 1995

U.S. Applications:
(63) Continuation-in-part of application No. 08/338,276, filed on Nov. 14, 1994, now Pat. No. 5,451,443, which is a continuation of application No. 08/046,640, filed on Apr. 14, 1993, now abandoned.

(51) Int. Cl.
*B32B 3/10* (2006.01)

(52) U.S. Cl. ..... 428/99; 428/27; 47/69; 47/83; 119/256; 248/27.8

(58) Field of Classification Search ..... 428/17, 428/27, 99; 119/253, 256, 269; 248/27.8; 47/69, 78, 79, 83
See application file for complete search history.

(56) References Cited

U.S. PATENT DOCUMENTS 3,169,897 A * 2/1965 Yue ..... 428/27
5,365,884 A * 11/1994 Jones ..... 119/256

FOREIGN PATENT DOCUMENTS

GB 1039188 * 8/1966
GB 2021371 * 12/1979

* cited by examiner

*Primary Examiner*—Alexander S. Thomas

(57) ABSTRACT

An article anchoring accessory includes a support element for reception within an enclosure, such as for example an aquarium serving as an anchoring structure to which objects can be secured. The support element will conveniently be of relatively widened expanse presenting an upper surface area, and will be advantageously be of flattened shape, at least over portions thereof. The support element may optionally be of a configuration presenting a series of flattened regions arranged in stepped fashion, the upper surfaces of which are each in spaced-apart relation with the enclosure bottom by varying degrees, for inclusion below a sloped gravel bed. Means are provided for fastening the article to the support element at a selected position along its expanse, conveniently, by use of coupling members designed to grasp the article, and also for firmly engaging the support element. Alternatively, fastening means may be carried directly on either the article or structure itself, or may comprise cooperating fastening means carried both on the support element and conveniently on the base of the article, thereby obviating the need for coupling members. The support element may be a single structural unit, or may be alternately comprised of a plurality of joinable sections which may be interconnected to form a contiguous, integrated support element, thereby facilitating custom sizing for use within aquariums of varying base dimensions.

25 Claims, 8 Drawing Sheets

ARTICLE ANCHORING ACCESSORY FOR USE WITHIN AN ENCLOSURE

Matter enclosed in heavy brackets [ ] appears in the original patent but forms no part of this reissue specification; matter printed in italics indicates the additions made by reissue.

REFERENCE TO RELATED APPLICATION

This application is a continuation-in-part of application Ser. No.08/338,276 filed Nov. 14, 1994, entitled ARTICLE ANCHORING ACCESSORY FOR USE WITH AQUARIUMS now U.S. Pat. No. 5,451,443 which in turn is a continuation of prior co-pending application Ser. No. 08/046,640 filed Apr. 14, 1993 entitled ARTICLE ANCHORING ACCESSORY FOR USE WITH AQUARIUMS now abandoned.

BACKGROUND OF THE INVENTION

This invention relates to accessories for use in aquariums, terrariums and other like applications involving placement of articles within an enclosure, including for example aquarium plants and the like, and more particularly to an accessory for firmly attaching such articles to prevent movement thereof relative to the enclosure in which they are placed.

Placement of articles within a terrarium, aquarium or other like enclosure is often desirable in attaining the most functional, as well as aesthetically pleasing, simulated environment. For example, decorating an aquarium generally includes the addition of aquatic plants and other items, for providing a natural looking, as well as an ecologically balanced environment. Water buoyancy and the currents produced within the aquatic environment poses a particular challenge in maintaining placement of such articles. Typically, any article included in the aquarium for positioning at a submerged location is partially buried in a substrate, such as, for example, gravel, at its base. However, since many of the articles, particularly both live and artificial plants, are generally light in weight, some form of anchoring device has been employed to keep them in place, and in many instances, to prevent them from floating to the surface. Live plants have generally been anchored by a weight, tied to the bottom of the plant, to assist in securement under the gravel until roots developed sufficiently. In the case of artificial plants, a flat disk or similar member having its surface expanse oriented in the horizontal plane, would be typically affixed to the base of each plant, which when buried under the weight of gravel, provided a limited degree of stability.

Although these solutions were effective under conditions of minimal disturbance, when faced with more demanding conditions, they did little to anchor the plants or articles in the location in which they were placed. Strong currents within the tank, as well as stoking the aquarium with larger fish or turtles, would quickly destroy any plant arrangement. In addition, during tank maintenance, requiring among other things cleaning of the gravel, plants were invariably uprooted. Furthermore, while trying to capture a fish in a net for removal from the tank, plants were easily disturbed and uprooted. As a result, frequent replanting was required.

Problems relating to movement of articles from a position in which they are initially placed in an enclosure free of water, although generally not as problematic as those encountered in an aquatic surrounding, can be also be troublesome.

OBJECTS AND SUMMARY OF THE INVENTION

Accordingly, it is an object of the invention to provide an accessory for securing any article within an enclosure, including both live and artificial aquatic plants, as well as other decorative and functional items, which overcomes the drawbacks of the prior art.

Another object of the invention is to provide an article anchoring accessory which permits the anchoring of plants or other articles at selected locations within an enclosure, while at the same time allowing easy removal and relocation of the articles if so desired.

It is a still further object of the invention to provide such an article anchoring accessory that is simple in design, inexpensive to manufacture and which is hidden from the view of the observer when installed in an enclosure.

Briefly stated, the present invention provides a support element for reception within an enclosure, such as for example an aquarium, at a distance below a top edge of same, and serving as an anchoring structure to which objects can be secured. For purposes of this disclosure, an enclosure will include a structure having a bottom and an upwardly extending peripheral boundary, and will include, for example, a terrarium for housing animals and/or plants, an aquarium, or other like functional/decorative housing. The invention will find particular application, for example, in an aquarium filled either partially or entirely with water, in which reception of the accessory will permit securement of the articles in wholly underwater, as well as extending above the surface situations. The support element will conveniently be of relatively widened expanse presenting an upper surface area, and will advantageously be of flattened shape, at least over portions thereof. These flattened regions will include, for example, a true flat surface, surfaces which in greater part are flat but have some protrusions, or non-horizontal flat surfaces in a lessor part thereof. The support element may further be of such configuration presenting a series of such flattened regions arranged in stepped fashion, the upper surfaces of which are each in spaced-apart relation with the enclosure bottom by varying degrees. When included below a sloped gravel bed, this configuration assures that articles, when attached to the structure, will be buried by an approximately uniform depth of gravel at their point of attachment to the support structure, over all regions of the widened expanse comprised of the total of the stepped regions. By further providing upwardly extending ledges between adjacent stepped regions of the support element, sloping of the gravel substrate is facilitated by retention of the gravel at a particular level within each stepped region, the depth of which is determined by the height of the ledge bounding the region.

The support element according to the invention will be maintained in a fixed position with respect to the bottom of the enclosure. To this end, the weight of gravel above the support element is generally sufficient to hold it securely in place when the element is sized to extend over a substantial portion of the bottom of the enclosure. However, if so desired, and for more secure adhesion, it may be alternatively fixed to the bottom of the enclosure with cement, suction cups or the like. Means are provided for retaining a selected position of plants or other articles with respect to the perforated support element, conveniently accomplished by fastening thereof through the use of, for example, coupling members designed to grasp the plants or other items, and also for firmly engaging the support element. Alternatively, fastening means may be carried directly on either the article or structure itself, or may comprise cooperating fastening means carried both on the support element and conveniently on the base of the article, thereby obviating the need for coupling members. The support element may be a single structural unit, or may be alternatively comprised of a plurality of joinable sections which may be interconnected to form a contiguous, integrated support element, thereby facilitating custom sizing for use within aquariums of varying base dimensions.

In an embodiment of the invention, the support element is of flattened shape over a substantial portion of its widened expanse, and includes a plurality of spaced-apart perforations formed therein. The structure is received within an enclosure, such as for example an aquarium, for substantially horizontal orientation therein, roughly parallel to, and spaced a distance above a bottom thereof. The perforations, which conveniently define a plurality of discrete attachment points along the widened expanse, are advantageously arranged substantially over the widened expanse, which when in turn optionally sized to extend over a substantial area of the bottom of the enclosure, permits location of an article in any desired position within a peripheral boundary of the enclosure, without requiring lateral movement of the support element. The perforations are generally large enough to allow free pass-through of particles used in the substrate, thereby permitting, for example, gravel, when subsequently added to the tank, to fill the region between the aquarium bottom and the support element. Continued addition of gravel covers the support element by a desired depth, making its presence within the enclosure undetectable.

In an advantageous embodiment, the perforated support element comprises an open grid, formed form suitable material, such as rigid plastic filaments or ribs, the perpendicular intersecting ribs forming generally rectangular openings or perforations. Means are provided, for example in the form of spacers, for maintaining the support element a measured distance above the bottom of the enclosure. Coupling members designed to grasp the plants or other items, and also for firmly engaging the support element at selected discrete locations thereon, provide means for fastening plants or other articles to the perforated support element.

Several suitable embodiments of coupling members may be used in conjunction with the above support grid. In one such embodiment, the coupling member is generally an inverted U-shape, fashioned from a suitable resilient material, and having a cross sectional dimension corresponding to the openings in the grid elements. Channels adapted to engage the ribs of the support grid are carried horizontally on the outer and lower edges of the coupling member, such that when the coupling member is squeezed together and inserted into the opening, the ribs defining the opening engage the channels of the coupling member when pressure is released, thereby holding it firmly in place. Means are provided in the coupling member for grasping a plant or other article. In one means embodiment, a hole in the arch of the inverted U-shaped coupling member is smaller than the stem diameter at the base of a plant. Radial slits extend outwardly from the hole, such that when a plant is inserted through the hole, the slits allow pie shaped segments defined by the slits to extend downwardly, firmly gripping the plant. In the case of live plants, a soft foam insert within slits in contact with the plant is preferred, so as not to damage the stem tissue.

In an alternate embodiment, the coupling member is comprised of an upper and lower planar portion, separated by a spacer portion, such that the upper and lower portions are parallel with each other, and separated by a distance substantially corresponding to the thickness of the ribs of the support grid element. The lower portion of the coupling member is generally rectangular, sized and shaped to fit through the openings of the grid. The upper portion is made large enough not to fit through the openings. The spacer portion is generally circular, having a diameter corresponding to the shorter width of the rectangular opening. The coupling member is inserted into a desired grid opening until the upper portion rests on the top of the support element. Twisting the coupling member one quarter of a turn causes the lower rectangular portion to engage the ribs of the support element, holding the coupling member in place. Plants are held in place by a compression type fitting located at the top of the coupling member, or other suitable means.

In another embodiment, a support element/coupling member configuration facilitates rearrangement of an existing setup by providing self-centering means. A plurality of holes having tapered entryways, each defining a discrete attachment location along a support element, are advantageously arranged in a tight-packed, bee-hive like formation, thereby minimizing surface area between adjacent holes. This configuration facilitates connection of an article to the support element, particularly when already covered with a substrate, by guiding the coupling member into a nearest hole, even when not oriented in precise vertical alignment therewith.

An alternate embodiment of the invention provides a support element that is not perforated, as described above, but rather includes a series of protrusions extending from the upper surface, allowing attachment to the plants or other article by use of a female connector adapted to receive and grasp the protrusions. In this event, the support element could be in direct contact with the bottom of the aquarium, since the coupling means need not extent downwardly though perforations in the support element.

An additional embodiment provides a support element comprised of a series of rails extending between lateral support members, thereby providing continuous attachment points along each rail or between adjacent ones.

A still further embodiment is directed to the anchoring of larger articles, such as for example coral or driftwood, requiring attachment to the support element at more than one location for secure coupling therewith. A pair of coupling members, for example, would be interconnected by a length of thin cable or flexible banding material, which when strapped over the article, would hold it to the support structure when each of the pair of coupling members were engaged with the support structure at locations thereon on either side of the article. The bands could optionally be made of a material having an index of refraction of that substantially the same as water, rendering them virtually invisible in an aquatic environment.

The present invention is particularly suited to its embodiment as a kit with which components for anchoring accessory items in an aquarium can be provided so that the user has at hand, with puncture of a kit, all that is needed to achieve that end. Such a kit would contain a support element sized according to the aquarium in which it is to be included. In a particularly advantageous embodiment, the kit would contain a plurality of joinable sections connectable to one another, end to end and/or side to side, to form a contiguous integrated support element of appropriate size, permitting custom sizing for use in various size aquariums. In the event the support element and/or the articles themselves did not include inherent in their structure means for article/support element coupling, one or more coupling members for fastening of the articles to the support element would also be included in such a kit. Further, such a kit would optionally include a selection of artificial plants, which when connected to the support member at selected discrete locations therealong, would, when so assembled by the user, recreate pre-designed plant arrangements matching those prescribed and illustrated by directions included with the kit. Still further, numbered and/or lettered index markings could also optionally be provided on the support element, corresponding to rows and columns of attachment points, conveniently disposed along the edges running the length and width thereof, to facilitate location of the plants in their proper location within the matrix of possible discrete attachment locations.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
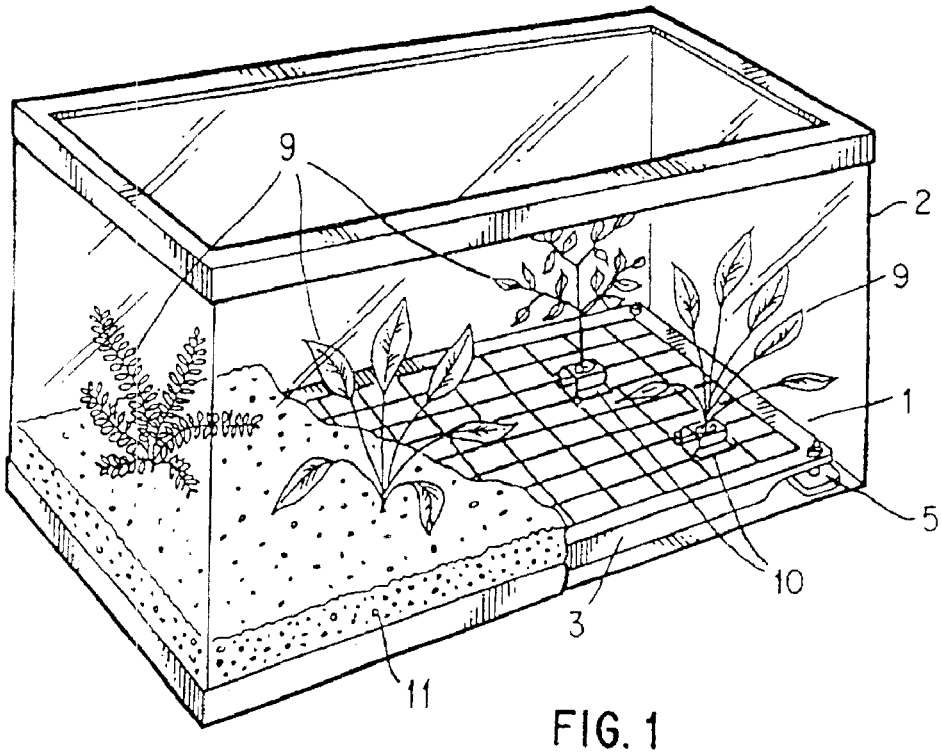
FIG. 1 is a perspective view of one embodiment of the present invention installed in an aquarium.
Figure 2:
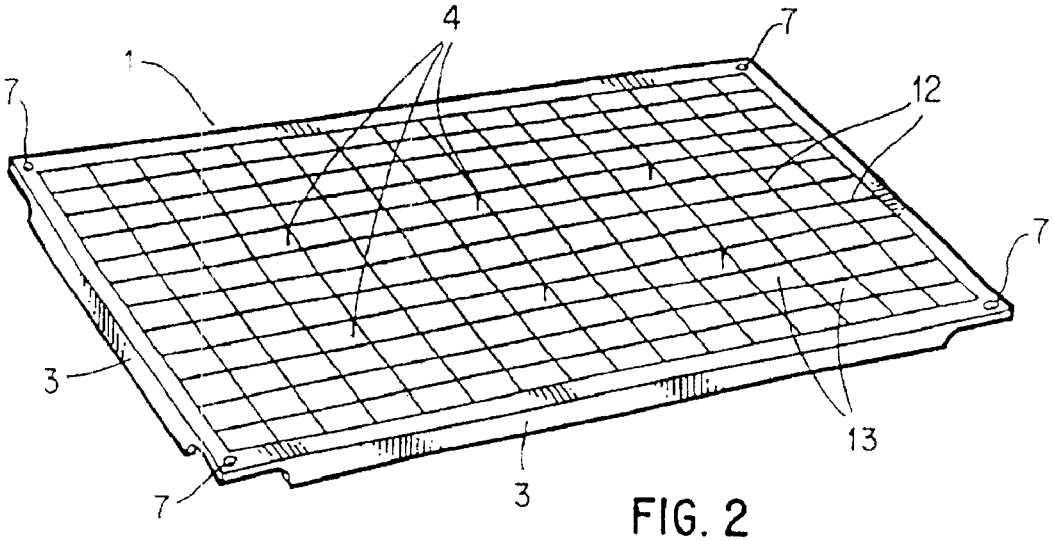
FIG. 2 is a perspective view of the perforated support element used in the FIG. 1 embodiment.
Figure 3:
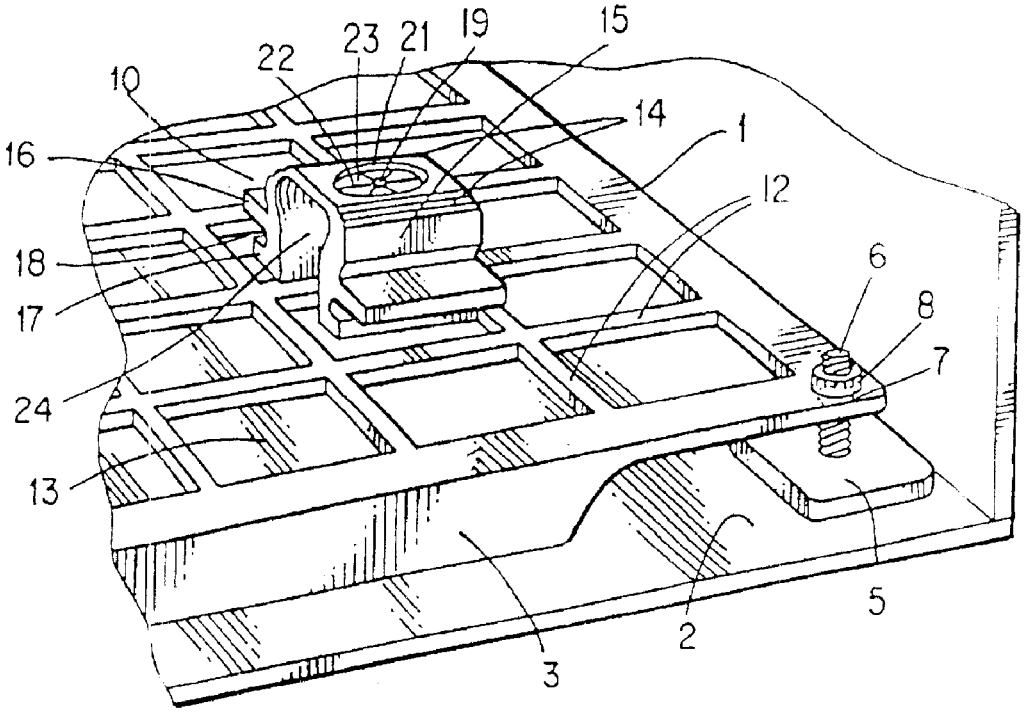
FIG. 3 is a fragmentary perspective view on enlarged scale of the embodiment in FIG. 1 with the coupling member detached.

Referring now to the figure, and in particular FIGS. 1–3, there is shown an embodiment of an anchoring accessory in accordance with the invention, which includes a support element 1 sized for reception within an enclosure generally including a bottom of a size defined by an upwardly disposed peripheral boundary, for example, an aquarium 2. Support element 1 is conveniently of relatively widened expanse presenting an upper surface area, and in the embodiment depicted in FIGS. 1–3, which is advantageously of flattened shape over a substantial portion thereof. Means for maintaining support element 1 in a spaced apart manner from the bottom of aquarium 2, are provided in the form of, for example, a frame 3 of desired height surrounding support element 1, and which additionally, conveniently provides increased structural rigidity thereto. Additional spacers 4 may optionally be arranged along the bottom of the support element 1 to prevent sagging over the widened expanse between frame 3. Support element 1 is securable within aquarium 2, which may be accomplished by a number of suitable means. For example, when configured as described above, support element 1 may be adequately secured with respect thereto by simply placing it in resting engagement with the bottom of aquarium 2, without requiring mechanical fixing. Dislodging forces applied to an article fastened to support element 1 at a discrete location, as will be described below in detail, are spread over a relatively large surface area defined by the widened expanse of support element 1, thereby effectively discouraging movement thereof when imbedded in a substrate disposed at the bottom of aquarium 2. However, where greater stability is desired, support element 1 is optionally secured to the bottom of aquarium 2, for example, by securement pads 5, a base portion of which is cemented to the bottom of aquarium 2. Securement pads 5 are conveniently located at each corner of support element 1. A suitable non-toxic silicone glue or the like may be used effectively for such purposes, or alternately, securement pads may be provided with a pre-applied pressure adhesive, exposed for use by peeling a protective paper covering (not shown). As best depicted in FIG. 3, securement pads 5 are each provided with a threaded post 6 which fits through clearance holes 7 disposed at each corner of support element 1. A nut 8 holds support element 1 securely in position within aquarium 2, and yet allows removal of support element 1 as desired.

Support element 1 of the embodiment of the invention, as depicted alone in FIG. 2, is advantageously comprised of longitudinal and transverse ribs 12 defining generally rectangular openings 13. This can be a molded product as shown, or can be woven like a mesh from suitable material. Such suitable materials will include, for example plastic or other formable substance which is advantageously not adversely affected by submersion in water, since the invention will find particular application for use within aquatic habitats, in which buoyancy and current effects of water are particularly troublesome to securement of articles. Additionally, the material selected for support element 1 should advantageously provide a sufficient degree of structural rigidity, such that when articles are fastened to support element 1, the support element 1 retains its shape upon application of forces tending to dislodge the articles.

Openings 13 are large enough to allow free pass-through of a selected substrate having a particular particle size used at the bottom of aquarium 2. This feature will insure that there are no pockets of stagnant water beneath the support element 1 when the substrate, for example, gravel 11, is introduced into aquarium 2, which might otherwise encourage the development of harmful bacteria, particularly when in use below water. Openings 13 conveniently define a plurality of discrete attachment points along the widened expanse, advantageously arranged substantially over the widened expanse bounded by frame 3, thereby permitting location of an article in any desired position therealong. Means are provided, conveniently, for example, in the form of clip coupling members 10, for fastening an article to support element 1 at a selected location therealong, the operation of which will be described in detail below. Support element 1 is advantageously sized to extend over a substantial area of the bottom of aquarium 2, thereby permitting location and securement of an article, for example a plant 9, in virtually any desired location within a peripheral boundary of aquarium 2, without requiring lateral movement of support element 1. By dimensioning support element 1 slightly smaller than the bounded bottom of aquarium 2, gravel 11 is permitted to fill the gap present between the upwardly disposed peripheral boundary and frame 3, which when added to the aquarium 2 sufficient to completely cover support element 1 and clip coupling members 10, renders support element 1 undetectable to an observer. It is generally simplest to fasten clip coupling members 10, and plants 9 held thereby, to support element 1 prior to the addition of gravel 11. However, should the user decide to change the arrangement of the plants 9 after the addition of gravel 11, the gravel 11 is simply brushed away at the base of a plant 9, exposing the clip coupling member 10 which can then be removed from the support element 1. Gravel 11 is then brushed aside at the desired new location, thereby exposing the support element 1. The clip coupling member 10 is then re-attached to the support element 1, with any remaining gravel 11 around the location allowing enough displacement to permit the installation. Gravel 11 is then rearranged to cover the clip coupling member 10. This procedure may also be followed when adding additional plants 9 following introduction of gravel 11.

FIG. 3 is a detail of an embodiment of a suitable clip coupling member 10 shown just prior to installation. The depicted shape is readily manufactured by extrusion techniques, making it extremely economical to produce. Clip coupling member 10 is generally an inverted U-shape, and has a pair of flex points 14, that allow it to be compressed when the pressure surface 15 are squeezed relative to each other. Clip coupling member 10 is comprised of a resilient material, such that when the applied pressure is released, it returns substantially to its original shape. Upper flanges 16 and lower flanges 17 are provided along both pressure surfaces of clip coupling member 10, and extend outwardly therefrom. Lower flanges 17 are adapted to fit into any of the rectangular openings 13 in support element 1 when clip coupling member 10 is squeezed. When pressure is released, a channel 18, separating the upper flanges 16 and lower flanges 17, receives ribs 12 of support element 1, thereby holding clip coupling member 10 firmly in place. A small hole 19 in the arch of the inverted U-shaped clip coupling member 10 is smaller than the stem diameter at the base of a plant 9. A larger hole 21 is counter-sunk in the arch of the clip coupling member 10 such that the material is made thinner and more flexible. Radial slits 22 extend outwardly from the small hole 19, such that when a stem of plant 9 is inserted through small hole 19, slits 22 allow flexible pie shaped segments 23, defined by radial slits 22, to yield and extend downwardly, firmly gripping the base of plant 9. When used with live plants, the larger hole 21 is conveniently drilled completely through clip coupling member 10, and pie shaped segments 23 are made of soft foam which is affixed to the underside of the arch of the U-shaped clip coupling member 10, such that the soft stem tissue is not damaged by insertion. As roots develop, they can extend downwardly through the opening 13 in the support element 1 and/or out through the open ends 24 of the clip coupling member 10.

Figure 4:
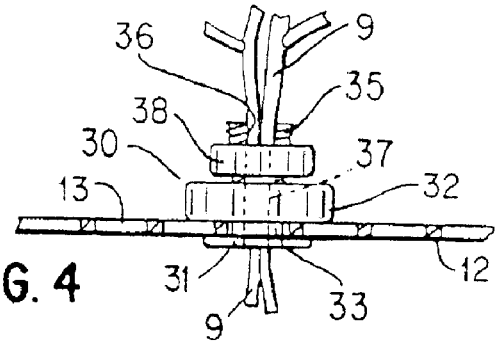
FIG. 4 is a side elevation view shown in partial cross-section, showing employment of another form of coupling member.
Figure 5:
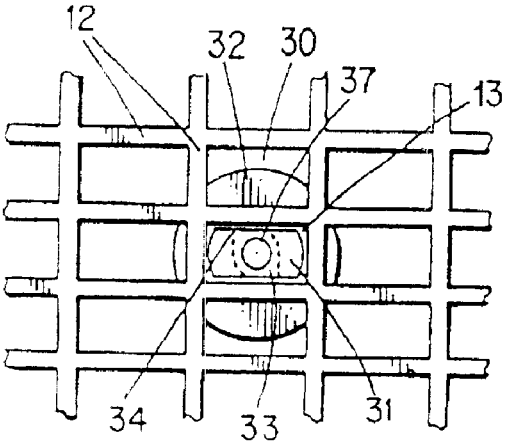
FIG. 5 is a fragmentary bottom elevation view of FIG. 4 showing the coupling member in unlocked condition.
Figure 6:
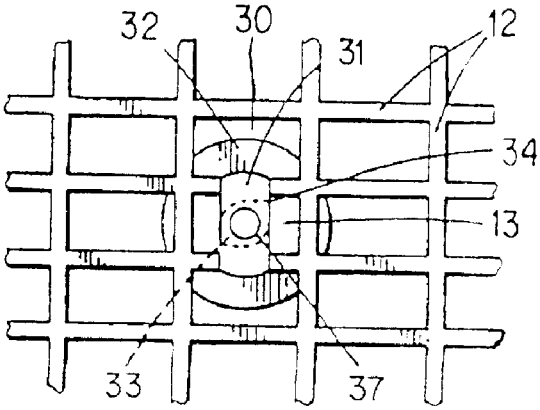
FIG. 6 is a fragmentary bottom elevation view of FIG. 4 showing the coupling member in locked condition.

An alternate embodiment of a coupling member suitable for use with the support element embodiment of FIGS. 1–3 is a twist type, generally designated 30, and is shown in FIGS. 4, 5 and 6. Twist coupling member 30 is comprised of a lower portion 31 having a shape and dimension corresponding to rectangular openings 13 in support element 1, and having just enough clearance to allow lower portion 31 to fit through opening 13. A knurled upper portion 32 is sized larger than the opening in support element 1, allowing it to rest in contact with the upper surface of support element 1 after lower portion 31 clears the opening. A generally circular middle portion 33 separates the upper portion from the lower portion by a distance equivalent to the thickness of ribs 12 of support element 1. The cross sectional width of middle portion 33 corresponds to the shorter dimension of lower portion 31, allowing twist coupling member 30 to be rotated after insertion into the any one of openings 13 of support element 1. In an advantageous embodiment, instead of being perfectly round, middle portion 33 of the twist coupling member is squared off at opposing corners 34, permitting rotation of twist coupling member 30 only one quarter of a turn before corners 34 engage ribs 12 of support element 1, preventing further rotation. Upon rotation, lower portion 31 of twist coupling member 30 engages ribs 12 of support element 1, and locks twist coupling member 30, securing it to support element 1. To remove twist coupling member 30, it is simply rotated one quarter of a turn in the opposite direction. FIGS. 5 and 6 show unlocked and locked positions respectively.

Above upper portion 32, twist coupling member 30 is provided with a tapered threaded portion 35 with vertical slots 36 formed therein. Twist coupling member 30 is also provided with a vertical bore 37 for receiving a base portion of plant 9. The threads on tapered threaded portion 35 are tapered along their length such that when a compression nut 38 threadingly received on threaded portion 35 is turned, moving it in an upward direction, the diameter of the vertical bore 37 inside tapered threaded portion 35 is decreased, squeezing the stem of plant 9 extending therethrough, and holding it in place. If plant 9 is live, it is advisable, for example, to wrap the base in a protective material, such as thin foam insulation, before inserting it into the vertical bore 37, to avoid damage to the stem tissue of plant 9. Developing roots would extend outwardly under support element 1 from an exposed end of a stem portion of plant 9 (FIG. 4).

Figure 7:
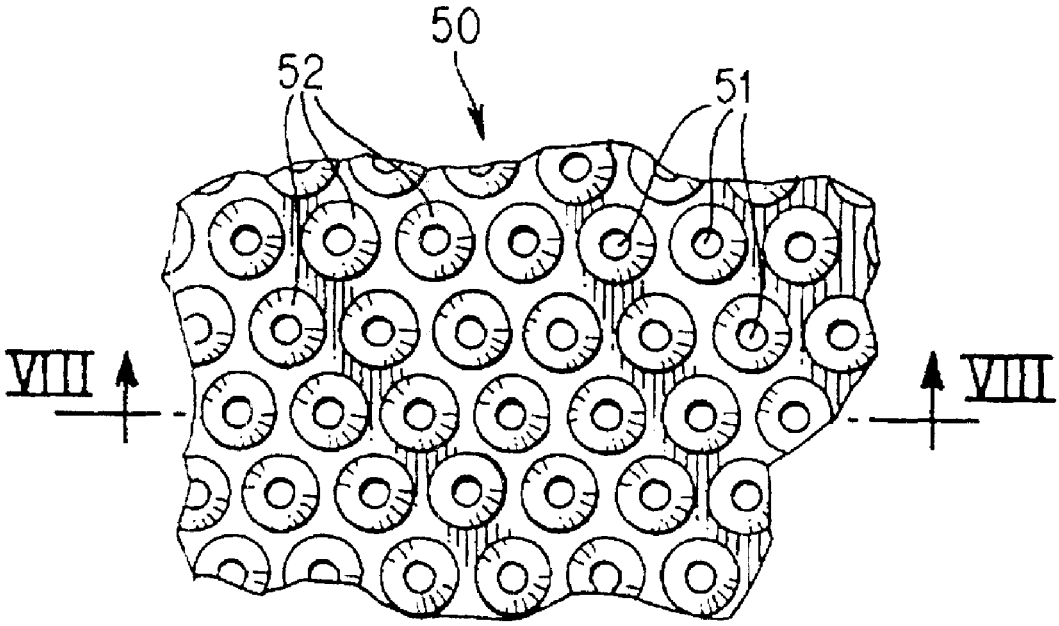
FIG. 7 is a fragmentary plan view of an embodiment of a support element including self-centering coupling means.
Figure 8:
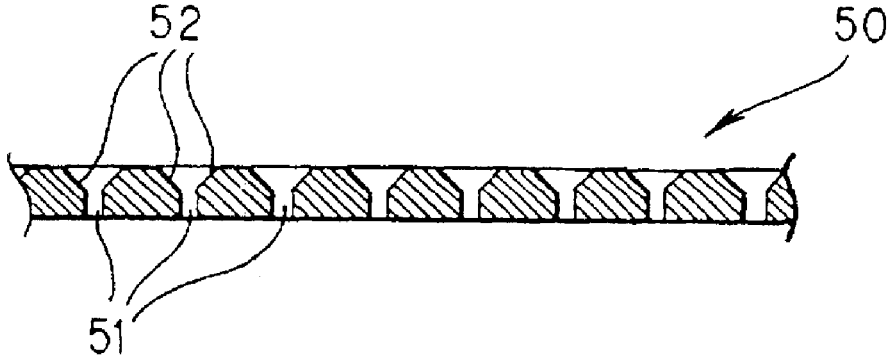
FIG. 8 is a cross-sectional view taken on line VIII—VIII in FIG. 7.

Another embodiment of the invention directed primarily to anchoring of articles other than live plants, is particularly well suited to the attachment of, for example, artificial plants, facilitating rearrangement thereof by providing a support element/clip arrangement which includes self-centering means. Turning now to FIG. 7, a support element 50 having structural characteristics equivalent to those described with respect to the preceding embodiment, includes a plurality of holes 51 advantageously arranged over a widened expanse thereof. A tapered entryway 52, conveniently or frustoconical shape, surrounds each hole 51. Holes 51 are advantageously arranged in a tight-packed, bee-hive like formation, as shown in FIG. 7, rather than in rows and columns as in the previously described embodiment, thereby minimizing surface area between adjacent holes. This configuration facilitates connection of an article to support element 50, particularly when already covered with a substrate, by providing self-centering means, as will be discussed in greater detail below, with reference to coupling members used in conjunction therewith.

Figure 9:
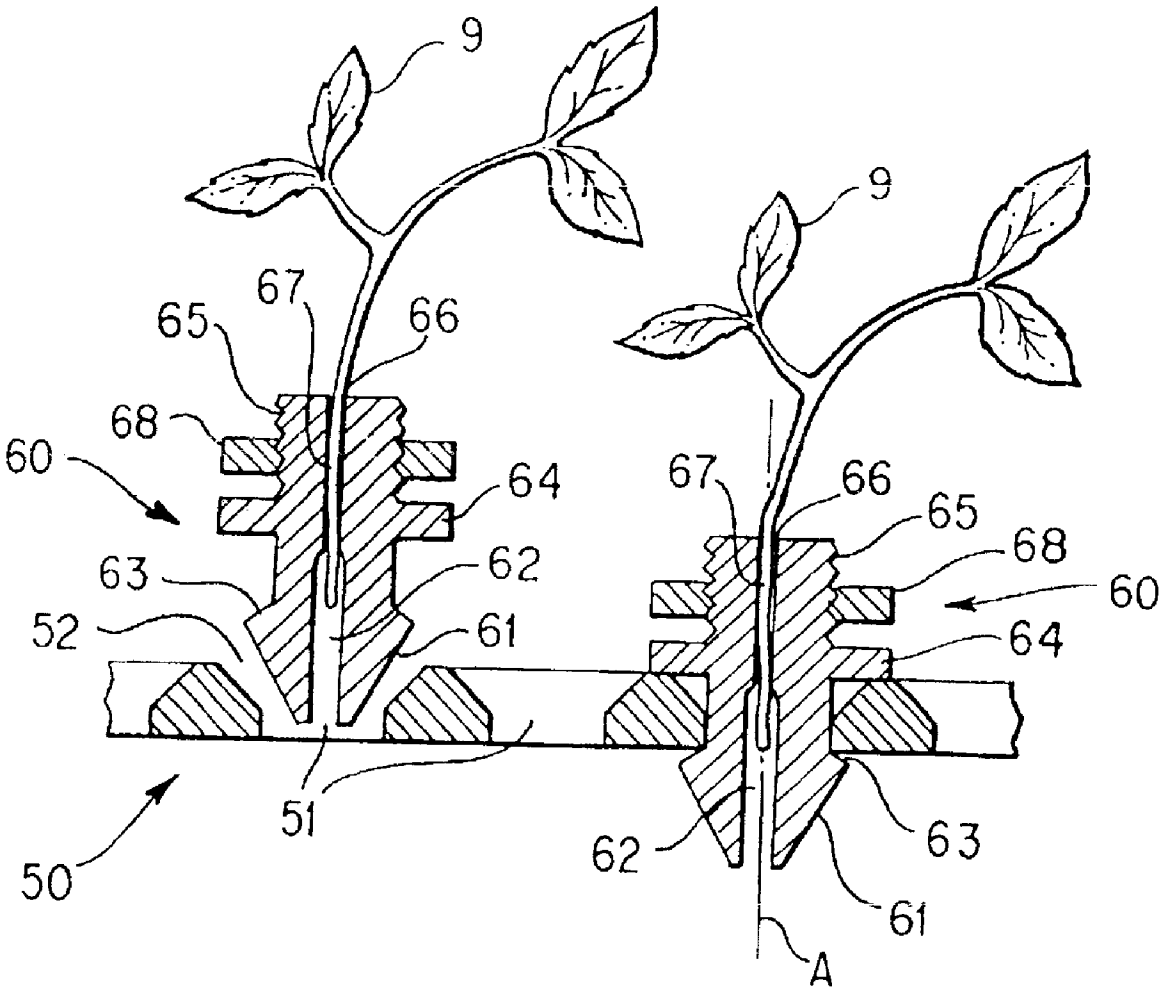
FIG. 9 is a cross-sectional detail of the embodiment of FIGS. 7 and 8, illustrating a coupling member before and after attachment to the support element.

Referring now to FIG. 9, an embodiment of a coupling member for use with support element 50 is shown, generally at 60. Coupling member 60 is conveniently of circular cross-sectional shape, generally symmetric about a central axis A. A tapered portion 61 at one end of coupling member 60 is advantageously tapered at an angle roughly corresponding to the angle of taper of tapered entryway 52 and includes vertical slots 62 running from a terminal end thereof and continuing a distance in a direction of central axis A. Vertical slots 62 permit the divided components of tapered portion 61 to be compressed inwardly when coupling member 60 is pressed downwardly into a selected hole 51. Coupling member 60 is fabricated from a resilient material, and when fully inserted, tapered portion 61 clears hole 51, openings to substantially its original, non-compressed state, thereby securely fastening coupling member 60 to support element 50. A stop 64 prevents further downward movement of coupling member 60 by shouldering against an upper surface of support element 50. A tapered shoulder 63 formed on an end of tapered portion 61 which is in contact with a lower surface of support element 50 when fully inserted, facilitates removal of coupling member 60 from hole 51. To remove coupling member 60, it is pulled with sufficient force to compress tapered portion 61, thereby permitting it to clear hole 51. The degree of angle of tapered shoulder 63 will determine the degree of force required to remove the coupling member 60. Optionally, tapered shoulder 63 should have an angle which provides sufficient resistance against undesirable dislodging of an anchored article, such as an artificial plant 9 yet permit removal of coupling member 60 by a pulling force in excess thereof, and yet not so great as to disturb securement of support element 50.

Coupling member 60 is provided with a tapered threaded portion 65 with vertical slots 66 formed therein, operating in equivalent fashion to twist coupling 30 described above with reference to FIGS. 4, 5 and 6. Coupling member 60 is also provided with a vertical bore 67 for receiving a stem portion of plant 9. The threads on tapered threaded portion 35 are tapered along their length such that when a compression nut 68 threadingly received on threaded portion 65 is turned on a direction moving it in an upward direction, the diameter of the vertical bore 67 inside tapered threaded portion 65 is decreased, squeezing the stem of plant 9, extending therethrough, holding is in place.

Because the terminal end of tapered portion 61 narrows to a point, and since adjacent hole 51 are in close proximity with one another, each having tapered entryways 52, coupling member 60 need not oriented exactly over a particular hole 51 when being attached to support element 60, the cooperating structures thereby providing self-centering means by guiding coupling member 50 into a nearest hole 61 when downward pressure is applied thereto. This feature is especially desirable where support element 60 is obstructed from view, as when gravel or other substrate is already present in the enclosure and above support element 60. It is noted that like the previously described support element embodiment, it is advantageous to provide holes 51 with a diameter greater than that of the substrate particle size to permit free pass-through, for the reasons discussed above.

Figure 10:
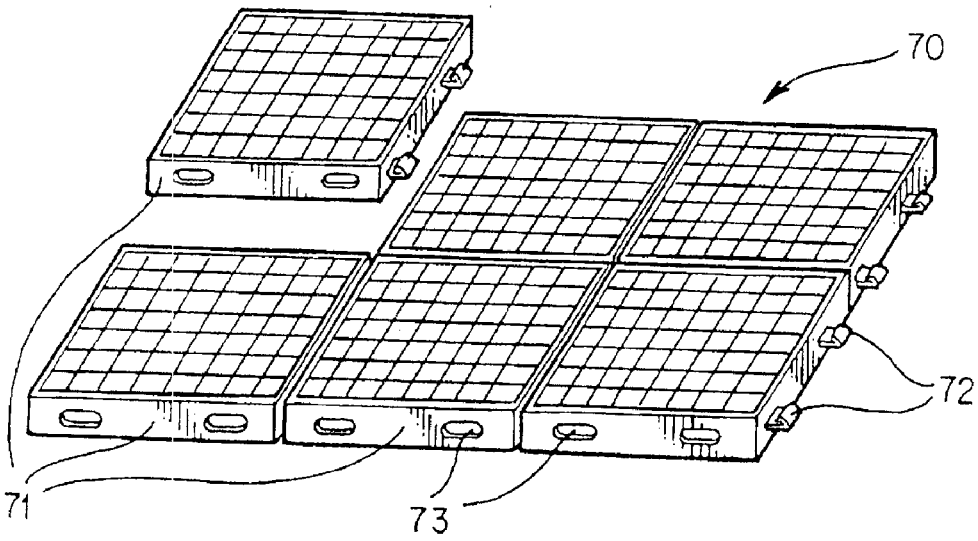
FIG. 10 is a perspective view of an embodiment of the invention employing an integrated support element comprised of interconnectable sectionalized sub-elements.

Turning now to FIG. 10, an embodiment of a support element in accordance with the invention, shown generally at 70, provides a modular structure for simplifying proper sizing thereof for use in variously dimensioned enclosures. A plurality of support sub-elements 71 (six are shown) are interconnectable to form integrated support element 70. This is particularly useful when the invention is to be received, for example, within a commercially produced aquarium. Such commercial aquariums are produced in a wide range of foot-print sizes, each corresponding to a size designation based on volumetric capacity. It is noted, however, that in general, aquariums are produced with base dimensions each of which are exact multiples of six inches. For example, a 15 gallon capacity aquarium typically has a length of 24 inches and a width of 12 inches. A 30 gallon aquarium is 36 inches long and 12 inches wide. A larger size tank, such as, for example, a 70 gallon tank, has a foot-print of 48 inches by 18 inches. As such, producing each sub-element 71 in a substantially square shape with approximately 6 inch sides, will advantageously permit integration thereof to form a support element 70 suitable for use in virtually every available aquarium size, receivable within the aquarium for coverage of a substantial area of the bottom thereof. For example, a support element 70 designed for reception within a 70 gallon aquarium would require 24 of such sub-elements, interconnected 3 wide and 8 long, to form a single support element 70 having approximate overall dimensions of 48 inches in length and 18 inches in width.

Means for interconnecting adjacent sub-elements 71 to one another are conveniently provided, for example, conveniently in the form of cooperating male and female connectors, designated 72 and 73 respectively, carried on facing side surfaces of sub-elements 71. It is noted, that one of the sub-elements is shown removed from a remainder thereof for purposes of better detailing the mode of interconnection. However, it will be understood, that when utilizing the illustrative structural configuration of male and female connectors 72 and 73, in practice, support element will require assembly row by row (or column by column).

Integrated support element 70 depicted in FIG. 10 functions in the same manner as the embodiment of FIG. 2, and therefore further discussion of equivalent structure is redundant. Discussion of its structure has therefore been limited to its modular nature as distinguished from the previously described embodiment. It will be understood to those skilled in the art that any support element embodiment falling within the scope of the invention as claimed herein can utilize equally the principles employing joinable sections interconnectable side by side and/or end to end to create a single integrated support element, without departure from its intended scope.

Figure 11:
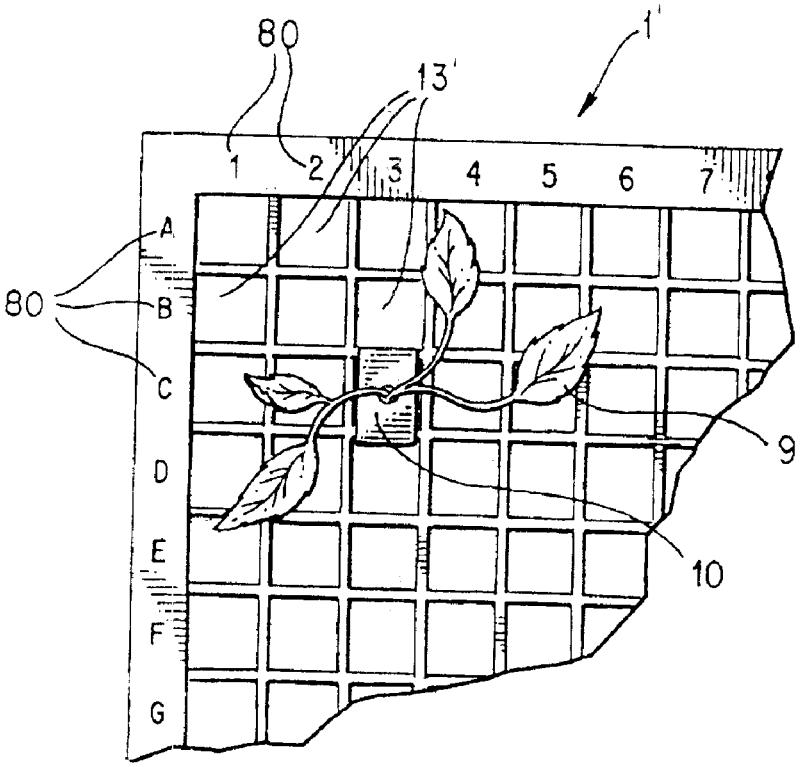
FIG. 11 is a plan view of an embodiment of the invention which includes alpha-numeric location designators arranged along rows and columns corresponding to discrete location points along the widened expanse of the support element.

Referring now to FIG. 11, a further embodiment of the invention is directed to a support element providing simplified means for locating a particular position along the widened expense thereof, the support element generally designated 1'. Although not essential to the embodiment, the structure of support element 1' as depicted in FIG. 11' has been selected for illustration purposes only, to be the same in all respects to support element 1, shown and described with reference to FIG. 2. This embodiment further provides the addition of a series of index markings 80, for example in the form of alpha-numeric indications, conveniently disposed along the edges running the length and width thereof. Corresponding to rows and columns of attachment points defined by openings 13' in support element 1', index markings 80 facilitate location of articles, for example plants 9, in their proper location within the matrix of possible attachment locations. This feature facilitates attachment of plants or articles at selected discrete locations therealong, for example, to precisely recreate pre-designed plant arrangements matching those prescribed and illustrated as part of directions optionally supplied with the anchoring accessory according to the invention. In FIG. 10, for example, clip coupling member 10 is fastened to support element 1' at location C-3 along the widened expanse thereof.

It is noted that this indexing embodiment may also be employed on a support member wherein the discrete attachment locations are not arranged in perpendicular rows and columns, as above. For example, in the support member embodiment as described with reference to FIG. 7, the discrete attachment points are each arranged on a diagonal. In this instance, labeling any two intersecting diagonals will be sufficient in locating any point along the widened expanse.

Figure 12:
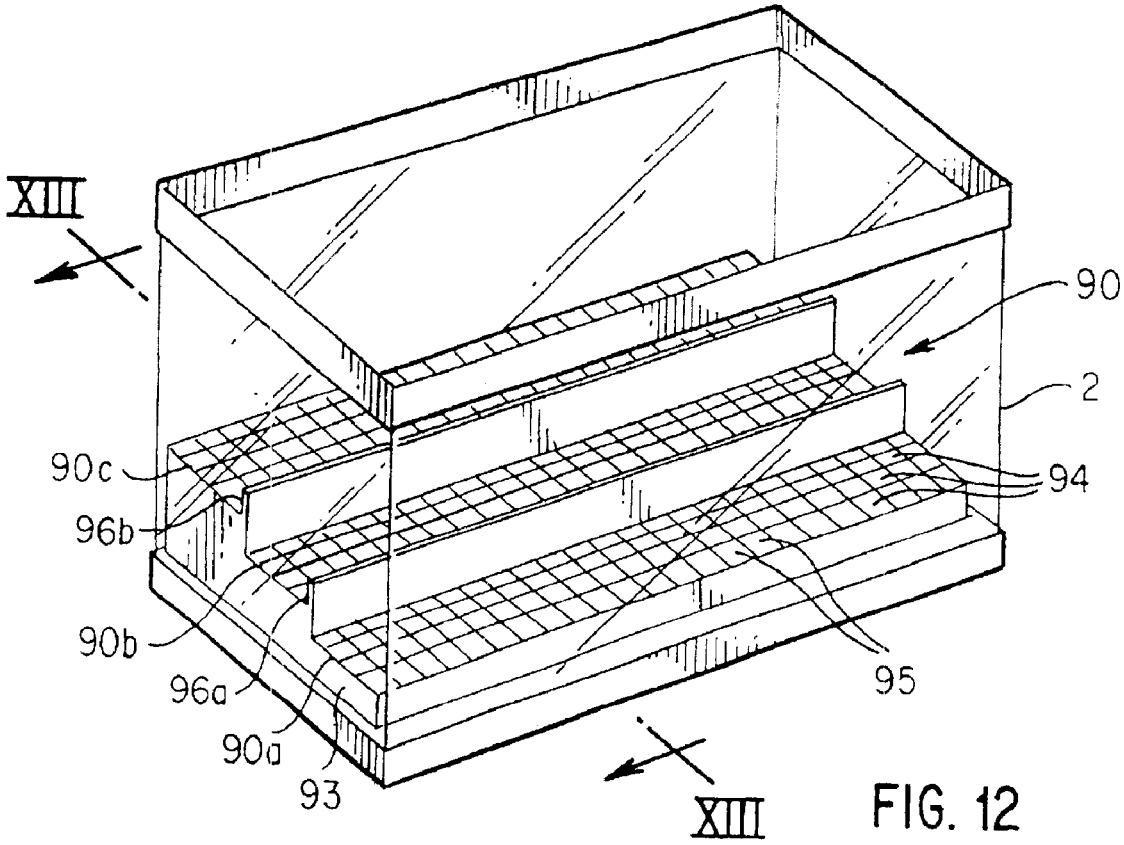
FIG. 12 is a perspective view of an embodiment of the invention suited to use in an enclosure having a sloped substrate.
Figure 13:
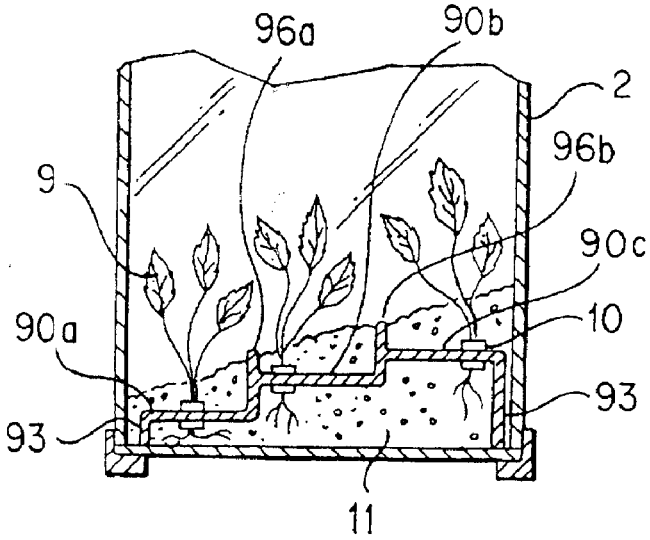
FIG. 13 is a cross-sectional view taken along line XIII—XIII in FIG. 9.

The above embodiments are directed primarily to applications where articles are to be included in an enclosure in which an added substrate has a somewhat uniform depth along the bottom thereof. However, in many applications directed to the anchoring of articles, it is often desirable to provide a substrate having irregular depths over various regions thereof. For example, many aquarium hobbyists prefer to slope the gravel substrate from front to back in the aquarium, thereby providing the greatest depth of gravel in the fartherest from the viewer, and the shallowest in the foreground. Turning now to FIGS. 12 and 13, an embodiment of the invention includes a support element comprising a structural configuration presenting a series of flattened regions arranged in stepped fashion, the upper surfaces of which are each in spaced-apart relation with the enclosure bottom by varying degrees, shown generally at 90. Stepped support element 90 functions in the same manner as the embodiment of FIG. 2, and therefore further discussion of equivalent structural aspects has been omitted as redundant. For example, stepped support element 90 includes the equivalent structures of a frame 93, intersecting ribs 94 defining a plurality of openings 95 for reception of the same type coupling member, for example a clip coupling member (FIG. 13). It will be understood to those skilled in the art that any support element embodiment falling within the scope of the invention as claimed herein can utilize equally the principles employing an irregular surface configuration, including for example a stepped configuration as described in this embodiment, and are thereof contemplated to be within the intended scope of the invention. Stepped support element 90, includes a series of stepped regions, for example, there, as depicted, the stepped regions designated 90a, 90b and 90c, oriented from foreground to background of an aquarium 2, respectively. Stepped support element 90, when included below a sloped gravel bed 11; assures that articles, when attached to the structure, will be buried by an approximately uniform depth of gravel 11' at their point of attachment to stepped support structure 90, over all regions of the widened expanse comprised of the total of the stepped regions 90a, 90b and 90c. Upwardly extending ledges 96a and 96b are optionally provided between adjacent stepped regions 90a and 90b and adjacent stepped regions 90b and 90c of support elements 90, respectively. When gravel 11' is added to the aquarium 2, sloping of the gravel substrate 11' is facilitated by retention thereof at a particular level within each stepped region 90a, 90b and 90c above stepped support element 90, the depth of which, in each of the regions, is determined by the height of the ledge 96a and 96b, bounding the region. For increased aesthetic appeal, the upper edges of ledges 96a and 96b can be colored and textured to resemble rocks or other naturally occurring formation such that if exposed, they do not detract from the appearance of the aquarium arrangement. Although, in the embodiment as depicted, the support element is configured to follow an increasing height gradient from front to back, a support structure may, for example, alternatively be constructed with a stepped region of greatest height disposed between two regions of lesser height, if so desired, without departure from the scope of the invention. Moreover, a structure presenting any irregular surface topography that permits attachment of articles to the structure at selected points thereon is contemplated within the intended scope of the invention.

Figure 14:
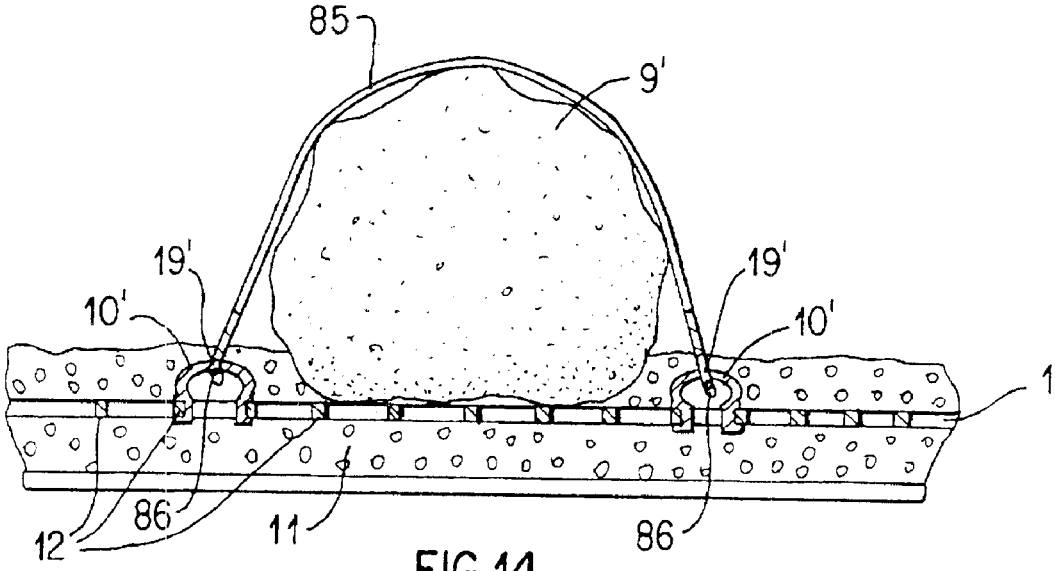
FIG. 14 is a side elevation view shown in partial cross-section, illustrating an embodiment suited for anchoring of an article requiring multiple points of attachment with a support element.

It is noted, that the previously described embodiments have been directed primarily to anchoring plants and other like articles at selected locations along a support element, the article being attached to the support element at a single attachment location thereon. It is however contemplated that an anchoring accessory in accordance with the invention may be equally effective in anchoring larger objects, such as, for example, coral and driftwood, perhaps, however, each article requiring attachment to the support element at more than one location for secure coupling therewith. Referring now to FIG. 14, an embodiment directed to attachment of such an article, and is considered to be representative of many possible alternate configurations also possible within the scope of the invention. An article 9' is anchored to a support element, for illustration purposes the same support element as described with reference to FIG. 2, and designated 1. A pair of clip coupling members 10' are similar in structure and function to those described in an above embodiment, with the exception of the absence of the means for receiving a plant stem. Instead, each clip coupling member 10' includes a hole 19' through its arch, for receiving a filament 85 therethrough. Filament 85 may also include, for example, thin cable, flexible banding material, or like material which when strapped over article 9', conforms to its shape, and holes it securely to support element 1 when each of the pair of clip coupling members 10' are engaged with support element at locations thereon on either side of article 9'. Filament 85 is fixed to clip coupling members 10' conveniently by tying a knot 86 on terminal ends thereof. Filament 85 could optionally be made of a material, such as certain clear plastics, having an index of refraction substantially that of water, rendering it virtually invisible when submerged in an aqueous environment. Further, conventional means could be provided for tightening filament 85 after installation of clip coupling members 10', simplifying secure anchoring of article 9' to support element 1.

Figure 15:
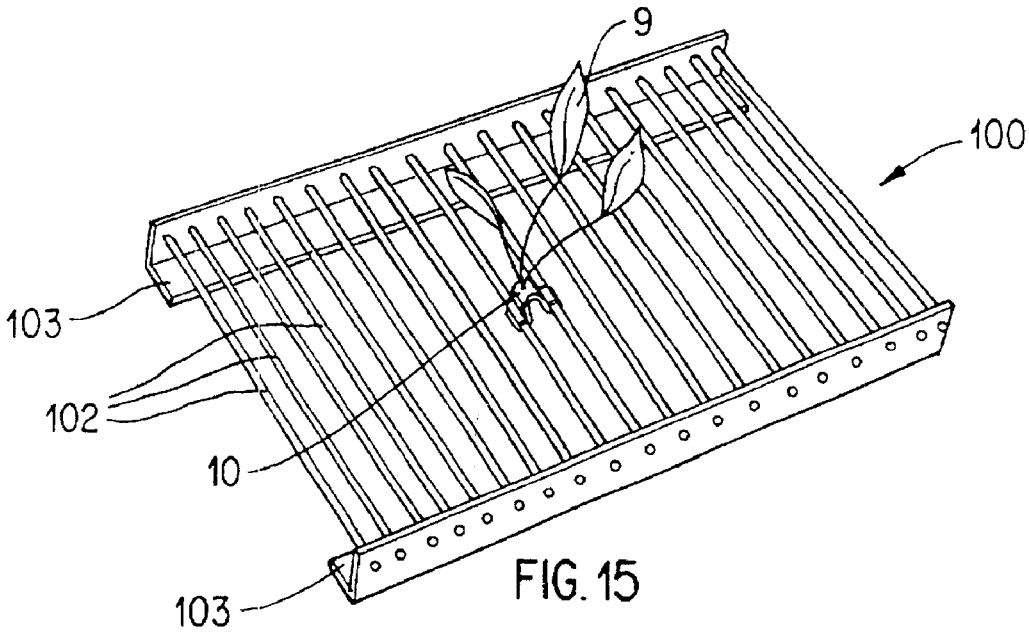
FIG. 15 is a perspective view of an embodiment of the invention providing continuously selectable attachment locations.

It is further noted, that although the embodiments included herein have been directed to a support element comprising a structure defining non-continuous, discrete reception points for fixing an article at the selected discrete location. However, a support element may alternatively provide an attachment means which provides an attachment surface permitting attachment over a continuous range of attachment points. For example, a cork-like material possessing suitable characteristics as defined herein, such as for example water compatibility, when designed for use in an aquatic environment, could comprise a support element attachment surface. A coupling member could be used in conjunction therewith, which would, for example, include in its structure means for piercing and gripping the attachment surface. In yet another example, an embodiment includes a series of rails extending between lateral supports, defining continuous anchoring points along each parallel rail or therebetween. Referring now to FIG. 15, a support element 100, includes a pair of opposed lateral supports 103 between which a series of rails 102 extend. In an advantageous embodiment, rails 102 are arranged parallel with one another, and are each fixed at both ends to support elements 100, as illustrated. IN the embodiment depicted in FIG. 15, rails 102 are of the same cross-sectional dimensions as ribs 12 in the embodiment of FIG. 3, and are separated by the same distance from an adjacent one, enabling reception of clip coupling member 10, also from the previous embodiment. Clip coupling member 10 to which plant 9 is attached, is fastened between adjacent rails 102 in the same manner as described with reference to the previous embodiment depicted in FIG. 3. Use of such a configuration provides that following advantages. Clip coupling member 10 can slide continuously between lateral supports 13, thereby providing higher resolution positioning than a support element having discrete attachment locations. Furthermore, by arranging lateral supports 103 parallel with the front and back of an aquarium when received therein, support element 100 permits convenient and economically advantageous sizing to suit a wide range of sizes. Since a majority of aquariums are of uniform width (i.e. the distance measured from front to back), only the length of lateral supports 103 need be altered to customize support element 100 for each aquarium application. Moreover, use of rails 102 which are removably connected to lateral support 103, enables support element to be sold in knocked-down kit form, for installation by the user. Knowing the size of the aquarium, the consumer wold merely specify the length of lateral support 103 required for a particular aquarium size, and the number of rods 102 accommodated by that length.

Figure 16:
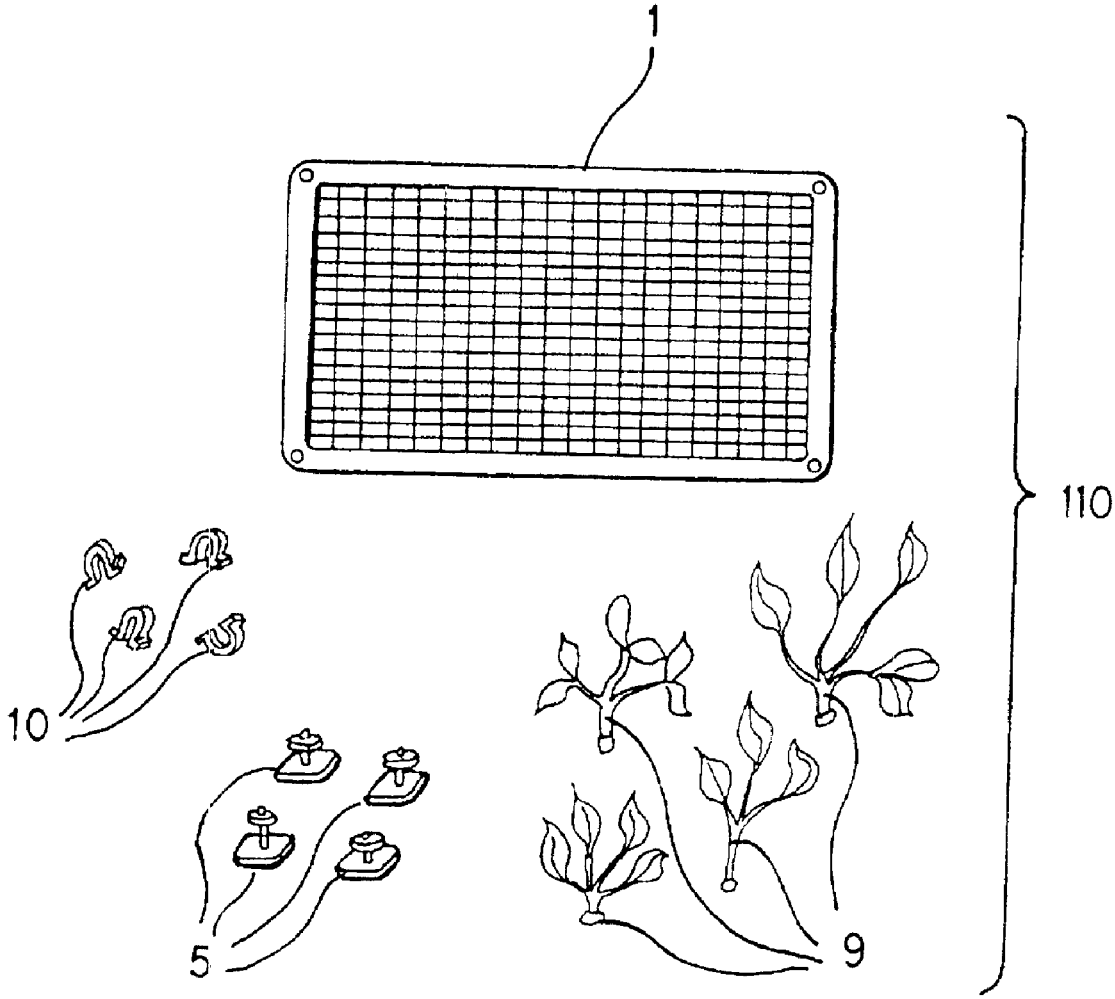
FIG. 16 is a perspective view of various element which may be included as part of a kit embodiment of the invention.

Additionally, the present invention is particularly suited to its embodiment as a kit which components for anchoring accessory items in an aquariums can be provided so that the user has at hand, with purchase of a kit, all that is needed to achieve that end. Such a kit would contain a support element sized according to the aquarium in which it is to be included. Optionally, artificial plants or other decorative accessories could also be supplied as part of the kit. In a particularly advantageous embodiment, the kit would contain a plurality of joinable sections connectable to one another, end to end and/or side to side, to form a contiguous integrated support element of appropriate size, permitting custom sizing for use in various size aquariums as described above in a previous embodiment. In the event the support element and/or the articles themselves did not include inherent in their structure means for article/support element coupling, one or more coupling members designated for use with the support element and for holding an article, for example, any of the artificial plants presently available on the market would also be included in such a kit. Further, such a kit would optionally include a selection of artificial plants, which when connected to the support member at selected discrete locations therealong, would when so assembled by the user, recreate pre-designed plant arrangements matching those prescribed and illustrated by directions included with the kit, also as mentioned above in a previous embodiment. Still further, numbered and/or lettered index markings according to an embodiment above could also optionally be provided on the support element, corresponding to rows and columns of attachment points, conveniently disposed along the edges running the length and width thereof, to facilitate location of the plants in their proper location within the matrix of possible discrete attachment locations. Referring to FIG. 16, one such kit is illustrated, generally designated 110. Kit 110 includes support element 1, clip coupling members 10, securement pads 5 and a selection of artificial plants 9. Such a kit 110 would be boxed or contained in a bag for customer convenience.

It is still further noted, that many artificial aquarium plants currently being manufactured are provided with some form of anchoring base, such as for example a disk-like member, and hence already incorporate a removable coupling means between the plant and the existing anchor. Therefore, in designing a coupling member for use with the present invention, it may be found commercially desirable to use a cooperating structure matching that of the existing coupling means already present on the plant. In this way, the existing anchor could be removed form the plant, and the plant then fastened, by the same principle of attachment, to the coupling member of the present invention, or directly to a support structure designed specifically for attachably receiving the plant. Further, any number of differently designed support elements as well as coupling members are possible. For example, the support element need not be perforated, but rather contain a plurality of upward projections onto which some type of female connector adapted to engage the projections could be fastened. Moreover, as already mentioned, coupling members can be omitted completely, and the plant and/or article provided with a fastening means as an integral part.

Having described preferred embodiments of the invention with reference to the accompanying drawings, it is to be understood that the invention is not limited to those precise embodiments, and that various changes and modifications may be effected therein by one skilled in the art without departing from the scope of spirit of the invention as defined in the appended claims.

What is claimed is:

1. An accessory for anchoring an article within an enclosure, comprising:

a support element including structure presenting a widened support expanse, receivable within said enclosure and being securable with respect thereto;

said support element including means for selectively positioning said article at any one selected location of a plurality of widened support expanse locations for disposition of said article in a position in which said article at least partially extends from an article disposition side of said widened support expanse; and means for fastening said article to said support element along said widened support expanse at said one selected location, said means for fastening including blocking structure movable with respect to cooperating structure carried on said support element by one of reorientation and deformation of at least one of said blocking structure and said cooperating structure from a position in which said blocking structure interferes with said cooperating structure of said support element and inhibits forcible separation of said article from said support element, to another position in which interference between said blocking structure and said cooperating structure of said support element is at least partially relieved for facilitated detachment of said article from said support element, said means for fastening being operable from said article disposition side.

2. The article anchoring accessory according to claim 1, wherein said support element is made in plural joinable sections.

3. The article anchoring accessory according to claim 1, wherein:

said widened support expanse includes a plurality of perforations therethrough;

said means for fastening an article includes at least one coupling member carrying a clasping element for engaging said widened support expanse; and said coupling means includes means for holding said article.

4. The article anchoring accessory according to claim 3, wherein at least one of a structure defining said plurality of perforations and said at least one coupling member includes means for self-centering said coupling member when effecting engagement thereof with said support element.

5. The article anchoring accessory according to claim 4, wherein:

structure defining at least a portion of said plurality of perforations includes tapered entryways; and said at least one coupling member includes a tapered structure on a support element engagement end portion of same.

6. The article anchoring accessory according to claim 5, wherein said plurality of perforations are arranged in a bee-hive array of same.

7. The article anchoring accessory according to claim 1, further comprising means for securing said support element to said enclosure.

8. The article anchoring accessory according to claim 7, wherein said securing means includes cooperative securing element disposable on said bottom of said enclosure and carried on said structure.

9. The article anchoring accessory according to claim 7, wherein said means for securing comprises a gravel layer above said structure.

10. The article anchoring accessory according to claim 1, wherein said support element is adapted for reception proximate a bottom of said enclosure, and includes means for spacing said widened support expanse above said bottom of said enclosure.

11. The article anchoring accessory according to claim 1, wherein said means for securably fastening includes cooperating structural elements carried on each of said article and said widened support expanse.

12. The article anchoring accessory according to claim 1, wherein said means for fastening include a plurality of projections protruding from said article disposition side of said widened support expanse, said projections comprising male connecting means for cooperating with female connecting means.

13. The article anchoring accessory according to claim 1, wherein:

said widened support expanse includes a plurality of intersecting ribs; and said plurality of perforations being openings adjoining and defined by ones of said plurality of intersecting ribs.

14. The article anchoring accessory according to claim 1, wherein:

said plurality of widened support expanse locations are arranged in a matrix; and said support element includes index markings corresponding to intersecting rows and columns of said matrix whereby particular ones of said plurality of perforations can be located by reference to a row and column pair of said index markings.

15. The article anchoring accessory according to claim 1, wherein said widened support expanse includes a plurality of stepped regions.

16. The article anchoring accessory according to claim 15, wherein said support element further includes retaining ledges at the junctions of adjacent ones of said stepped regions.

17. The article anchoring accessory according to claim 1, wherein said support element includes a pair of lateral supports and a plurality of spaced apart rails extending therebetween.

18. [Method] *A method* of anchoring an article within an enclosure, comprising the steps of:

securing a support element within [said] *the* enclosure, *said support element presenting a widened support expanse*;

selectively positioning said article at a [one] selected location [of a plurality of locations] along said support element for disposition of said article in a position in which said article at least partially extends from an article disposition side of said widened support expanse; and fastening said article to said support element at said [one] selected location[, said means for fastening including] *in a manner such that removal of said article from said support element is inhibited by interference between blocking structure carried on the article and cooperating structure carried on the support, said* blocking structure *and said cooperating structure being* movable with respect to [cooperating structure carried on said support element] *one another* by one of reorientation and deformation of at least one of said blocking structure and said cooperating structure from a position in which said blocking structure interferes with said cooperating structure of said support element and inhibits forcible separation of said article from said support element, to another position in which interference between said blocking structure and said cooperating structure of said support element is at least partially relieved for *permitting* facilitated detachment of said article from said support element, [said means for fastening] *movement of said blocking structure and said cooperating structure relative to one another between said position and said another position* being operable from said article disposition side.

19. A kit for anchoring an article within an enclosure, comprising:

a support element including structure presenting a widened support expanse, receivable within said enclosure and being securable with respect thereto, said support element being dimensioned such that a periphery thereof is proximate an internal peripheral boundary of said enclosure when received therein, said structure defining a plurality of discrete attachment locations disposed along said widened support expanse;

at least one coupling member including means for fastening said article to said support element at a selected one of said plurality of discrete attachment locations, said means for fastening including blocking structure movable with respect to cooperating structure carried on said support element by one of reorientation and deformation of at least one of said blocking structure and said cooperating structure from a position in which said blocking structure interferes with said cooperating structure of said support element and inhibits forcible separation of said article from said support element, to another position in which interference between said blocking structure and said cooperating structure of said support element is at least partially relieved for facilitated detachment of said article from said support element, said means for fastening being operable from said article disposition side; and said at least one coupling member including means for holding said article in a position in which said article extends at least partially from an article disposition side of said widened support expanse.

20. A method of anchoring an article within an enclosure, comprising the steps of:

securing a support element within [said] *the* enclosure, *said support element presenting a widened support expanse*;

selectively positioning said article at a [one] selected location [of a plurality of locations] along said support element for disposition of said article in a position in which said article at least partially extends from an article disposition side of said widened support expanse;

securely fastening said article to said support element at said [one] selected location for engagement thereto in a manner resisting detachment from said support element[, said means for securably fastening being operable from said article disposition side]; and said step of securably fastening including providing at least two coupling members each [which includes means for engaging] *engageable with* said widened support expanse and each being interconnected by a line, said article being disposed between said article disposition side of said widened support expanse and said line, and said at least two coupling members being securably fastened to said support element, *said at least two coupling members being operable from said article disposition side.*

*21. A method of anchoring articles within an enclosure bounded by a vertically extending peripheral boundary which defines an available bounded area within the enclosure, comprising the steps of:*

*providing support structure, said support structure including an attachment region of widened expanse defining discrete attachment locations at which the articles can be attachably positioned;*

*disposing the support structure within the enclosure;*

*securing said support structure within the enclosure to inhibit movement thereof with respect to the enclosure; and*

*fastening each of said articles to said support structure at selected ones of the discrete attachment locations for engagement thereto in a manner resisting detachment from said support structure, a number of said articles attached to said support structure being less than another number corresponding to the discrete attachment locations, such that some of said discrete attachment locations are unoccupied by the articles, whereby a range of different relative positional arrangements of the articles are achievable within said widened expanse.*

*22. A method according to claim 21, wherein:*

*said support structure is positioned in the enclosure with said widened expanse oriented along a generally horizontal plane; and*

*said step of securing includes covering at least area portions of said widened expanse with a substrate layer.*

*23. A method of anchoring an article within an enclosure bounded by a vertically extending peripheral boundary which defines an internal region of the enclosure, comprising the steps of:*

*disposing support structure within the enclosure, a portion of said support structure presenting a widened support expanse sized and configured to extend over a substantial portion of the internal region of the enclosure;*

*securing said support structure within the enclosure to inhibit movement thereof with respect to the enclosure;*

*fastening said article to said support structure at a discrete location along said widened support expanse for engagement thereto in a manner resisting detachment from said support structure; and*

*fastening another article to said support structure at another discrete location, appropriate selection of various discrete locations along said support structure thereby determining a relative orientation of said article and said another article with respect to one another and to the vertically extending peripheral boundary of the enclosure.*

*24. A kit for anchoring an article within an enclosure, comprising, in combination with the enclosure:*

*at least one support element including structure presenting a widened support expanse, said at least one support element being receivable within the enclosure and being securable with respect thereto, a periphery of said widened support expanse defined by said at least support element being sized to extend over a substantial area of a bottom of the enclosure when received therein, said widened support expanse including discrete attachment locations disposed therealong; and*

*at least one coupling member structurally adapted for fastenably engaging cooperating structure carried on said widened support expanse at said discrete attachment locations, said at least one coupling member further adapted for holding said article thereto, wherein fastenable engagement of said coupling member to said support element at a selected one of said plurality of discrete attachment locations holds said article to said support element in a manner resisting detachment therefrom.*

*25. A kit according to claim 24, wherein said periphery of said widened support expanse is dimensioned smaller than a peripheral boundary of said bottom of the enclosure to form a gap between said periphery and said peripheral boundary.*

* * * * *